United States Patent Office 2,967,819
Patented Jan. 10, 1961

2,967,819

PROTECTION OF PLATINUM-CONTAINING REFORMING CATALYSTS AGAINST HALOGENS

Leonard N. Leum, Media, and James E. Connor, Jr., Drexel Hill, Pa., assignors to The Atlantic Refining Company, Philadelphia, Pa., a corporation of Pennsylvania No Drawing. Filed Feb. 28, 1958, Ser. No. 718,123

10 Claims. (Cl. 208—88)

This invention relates to a method for protecting hydrocarbon reforming catalysts against the deleterious effects of halogens and more particularly it relates to a method for protecting platinum-containing hydrocarbon reforming catalysts against the deleterious effects of halogen compounds contained in the hydrocarbon charge material.

The charge material to commercial hydrocarbon reforming processes generally boils within the gasoline-kerosene range and is often contaminated with halogen compounds. These compounds present a particularly serious problem in those reforming processes wherein platinum-containing catalysts are employed since they deleteriously effect these platinum catalysts to such an extent that they cannot be regenerated but must be replaced.

The halogens contained in the charge material to reforming processes originate predominantly from two sources. For a number of years the producers of crude petroleum have resorted to so-called acidizing methods for increasing the flow of crude oil from wells. In these methods large amounts of hydrochloric acid are pumped into the producing formation to react with the calcareous and similar types of rock and thus increase the number and size of the channels through which the crude oil flows into the well. Since only a portion of the acid reacts, there is always a considerable amount of residual hydrochloric acid which mixes with the crude oil.

A large portion of reformer charge material is obtained as a distillate fraction from the crude oil and this so-called straight run naphtha contains organic halides resulting from the reaction of the residual hydrochloric acid with certain components of the crude oil.

For many years tetraethyl lead fluid has been used to improve the anti-knock characteristics of gasolines. Consequently, in nearly every refinery there are contaminating amounts of tetraethyl lead fluid in tank bottoms, lines, recycle streams, etc. Tetraethyl lead fluid usually contains between 60 percent and 62 percent tetraethyl lead, between 0.025 percent and 0.050 percent of a dye, between 1.5 percent and 3 percent hydrocarbons such as kerosene, and the remainder either ethylene dibromide or a mixture of ethylene dibromide and ethylene dichloride which halogen compounds are included for their scavenging effect on the lead. Thus, any reformer charge stock which becomes contaminated in a refinery with tetraethyl lead fluid, also will become contaminated with halogen compounds.

Two types of deleterious effects from halogen compounds in a reforming charge have been noted. With certain types of platinum-containing catalysts, particularly those wherein the platinum is associated with a silica-alumina cracking catalyst, the effect of halogen compounds in the hydrocarbon charge to the reforming process is one of poisoning of the catalyst to such an extent that it loses its ability to promote the various individual reforming reactions. With certain other types of platinum-containing reforming catalysts, particularly wherein the platinum is associated with alumina, halogen compounds in the charge in uncontrolled amounts cause an increase in the hydrocracking activity of the catalyst to such a degree that the catalyst loses its ability to promote the various reforming reactions in proper ratio with the result that the product distribution is adversely affected. In either event it has been found necessary to remove the catalyst from the process since it cannot be regenerated in situ.

It has now been found that if the reforming hydrocarbon charge containing halogen compounds is contacted with certain alkaline earth metal compounds prior to contacting the charge material with the platinum reforming catalyst, the halogen compounds will be removed from the reforming hydrocarbon charge and the platinum-containing catalyst will be protected from the deleterious effects of such halogen compounds.

It is, therefore, an object of this invention to provide a process for the protection of platinum-containing hydrocarbon reforming catalysts against the deleterious effects of halogen compounds contained in the hydrocarbon charge material to the reforming process.

It is a further object of this invention to provide a method for removing deleterious halogen compounds from the hydrocarbon charge to a reforming process.

It is a further object of this invention to provide a process for removing halogen compounds contained in the hydrocarbon charge to a reforming process by employing certain alkaline earth metal compounds to remove the halogen compounds prior to contacting the charge with the reforming catalyst.

Other objects of this invention will be apparent from the description and claims which follow.

In accordance with this invention the hot vaporous halogen-containing hydrocarbon charge to a reforming process, in the presence of recycle hydrogen employed in such process, is contacted with a bed of certain alkaline earth metal compounds in the form of solid pellets or granules prior to contacting the charge with the platinum-containing reforming catalyst. The specific alkaline earth metal compounds which may be employed are calcium oxide, calcium sulfide, barium oxide or barium sulfide, or mixtures of two or more of these compounds.

In order to provide mechanical strength to the alkaline earth metal compound pellets, the powdered alkaline earth metal compound may be mixed prior to pelleting with an inert material such as alumina or magnesia in amounts between 10 percent and 90 percent by weight, although the actual amount of inert material is not critical. The proportions should be such that the desired mechanical strength is reached when the mixture is pelleted. By inert material in this invention is meant a material which is unreactive for the removal of halogen compounds and which by itself is inert for promoting the reforming reactions.

The bed of the alkaline earth metal compounds may be situated either immediately above the catalyst bed in the reforming reactor and in contact with the reforming catalyst or it may be contained in an entirely separate vessel preceding the reactor vessel. In certain reforming processes wherein controlled amounts of halogen are added to maintain desired hydrocracking and isomerization activity, it is necessary to remove the halogens contained in the charge before adding the controlled amounts of halogen. In such event a separate vessel preceding the reactor should be used to contain the alkaline earth metal compound and following this vessel the desired halide addition agent may be introduced.

When the hot hydrocarbon charge containing the halogen compounds contacts the alkaline earth metal compound in the range of the reforming reaction conditions of temperature, pressure, hydrogen to hydrocarbon mol ratio, etc., the halogen compounds will react nearly stoichiometrically with the alkaline earth metal compounds to produce the corresponding alkaline earth metal halides. If the alkaline earth metal compound is an oxide, the reaction will also produce water as a product of the reaction with the halide; if the alkaline earth metal compound is a sulfide, there will also be produced hydrogen sulfide for the same reason. As mentioned, the protective materials of this invention are completely effective at the conditions of reforming. The reforming operation is carried out at temperatures of from about 600° F. to about 1000° F., a pressure of from about 50 to 1000 pounds per square inch, a liquid hourly space velocity of from 1 to 20 volumes of charge per volume of catalyst per hour, and a hydrogen to hydrocarbon mol ratio of from 1:1 to 1:10, or more.

In order to demonstrate in the laboratory the effectiveness of the above mentioned alkaline earth metal compounds in protecting platinum-containing catalysts, one of the more important reactions in catalytic reforming was followed by means of a convenient temperature phenomenon.

In order to demonstrate in the laboratory the effectiveness of the above mentioned alkaline earth metal compounds in protecting platinum-containing catalysts, one of the more important reactions in catalytic reforming was followed by means of a convenient temperature phenomenon. It is a characteristic of the reforming process using a fixed bed heated reactor with a platinum on cracking component type catalyst that at a point near the top of the catalyst bed the temperature of the catalyst will be at a minimum, which temperature is somewhat lower than either the inlet or the outlet temperatures to the bed. The explanation for this minimum in the catalyst bed temperature is relatively simple. One of the most important and most rapid reactions in catalytic reforming is the dehydrogenation reaction, i.e. the conversion of cycloparaffins to aromatics. This reaction is highly endothermic, that is, it utilizes rather large amounts of heat. Since it is a reaction that proceeds rapidly, it reaches its maximum rate at a point near the top of the catalyst bed and, under the laboratory experimental conditions, it removes heat faster than the heat can be supplied, with the result that there will be a minimum in the temperature "profile" of the catalyst bed at the point where the dehydrogenation is at its maximum.

With a catalyst which is not becoming deactivated for any reason, since the heat input and other conditions are maintained constant, this "minimum bed temperature" as it will be referred to hereinafter will remain at nearly a constant value at the same location in the catalyst bed. If the catalyst's ability to promote the dehydronation reaction declines during use, less dehydrogenation will occur and, therefore, less heat will be utilized with the result the minimum bed temperature will increase. Consequently, the increase in minimum bed temperature as well as any change in its location toward the outlet of the reactor gives very important information as to the rate of deactivation of the catalyst under test. The movement of the minimum bed temperature toward the outlet of the reactor (toward the bottom in a downflow type process) is the result of complete poisoning of the catalyst near the inlet so that the overall zone of reaction is displaced toward the outlet (downwardly).

The examples which follow will serve to illustrate the use of this method in demonstrating the utility of the above described alkaline earth metal compounds in protecting platinum-containing catalysts against the deleterious effects halogen in the reforming charge.

EXAMPLE I

A 75 cc. portion of a commercial silica-alumina platinum reforming catalyst which had a platinum content of approximately 0.5 percent by weight and wherein the silica-alumina cracking component had been partially deactivated by steam treatment prior to platinization was placed in a laboratory reforming test reactor having approximately a 1 inch internal diameter. A distillate from an East Texas crude source having the following properties:

ASTM distillation:
   Overpoint _____ ° F__  180
   50 percent _____ do____  250
   95 percent _____ do____  330
   Endpoint _____ do____  365
Clear octane number (ASTM Method D908–51)_  55
API gravity at 60° F. _____  56.5 together with 2.44 cc. tetraethyl lead fluid (61.41% tetraethyl lead, 35.68% ethylene dibromide, 0.03% dye, and 2.8% calcium type hydrocarbons) per gallon of distillate charge, was passed over the reforming catalyst from the top downwardly under the following conditions:

Temperature _____ ° F__  876
Pressure _____ p.s.i.g.___  500
Hydrogen to hydrocarbon mol ratio _____  10:1
Liquid hourly space velocity (volumes of charge
   per volume of catalyst per hour) _____  3.0

A thermocouple well was located in the center of the reactor so that the temperature of the catalyst bed could be determined throughout its length. The results of this experiment are set forth in Table I.

EXAMPLE II

A 75 cc. portion of the same catalyst as used in Example I was treated in exactly the same manner as shown in Example I, with the exception that the East Texas distillate contained pure tetraethyl lead (3 cc. per gallon of distillate) instead of tetraethyl lead fluid containing the halogen scavengers. The results from this experiment are shown in Table I.

EXAMPLE III

A 25 cc. portion of pelleted calcium oxide was placed on top of a 75 cc. portion of the same catalyst as employed in Example I. The same East Texas charge material was passed over the calcium oxide and platinum containing catalyst under the same conditions as in Example I, except that the East Texas distillate charge material contained 4.88 cc. per gallon of the tetraethyl lead fluid. The results of this experiment are shown in Table I.

EXAMPLE IV

A 25 cc. portion consisting of 13 cc. (21.9 grams) of barium oxide and 12 cc. (9.1 grams) of alumina which had been mixed in the powdered form and pelleted were placed on top of 75 cc. of the same silica-alumina-platinum reforming catalyst employed in Example I. The same East Texas distillate employed in Example III was passed over the barium oxide-alumina pellets and silica-alumina-platinum reforming catalyst under the same conditions employed in Examples I, II and III. The results of this experiment are shown in Table I.

EXAMPLE V

A 25 cc. portion of a pelleted material consisting of a mixture of 13.5 percent by weight metallic copper and a powdered commercial alumina was placed on a 75 cc. portion of the same platinum reforming catalyst employed in Example I. An East Texas distillate containing 4.88 cc. per gallon of the same tetraethyl lead fluid utilized in Examples III and IV was passed over the copper on alumina bed and platinum catalyst bed under the same reaction conditions employed in Examples I through IV, inclusive. The results of this experiment are shown in Table I.

Table I

| Example Number | Protective Material | Contaminant in Charge Material | Time of Test, Hours | Change in Min. Bed Temp., °F. | Movement of Min. Bed Temp. Toward Bottom of Reactor (Inches) |
|---|---|---|---|---|---|
| I | None | 2.44 cc. per gal. of tetraethyl lead fluid. | 5 | 13 | 1 |
| II | None | 3.0 cc. per gal. of pure tetraethyl lead. | 10 | 0 | 0 |
| III | CaO | 4.88 cc. per gal. of tetraethyl lead fluid. | 7 | 1 | 0 |
| IV | BaO—$Al_2O_3$ | ...do... | 6 | 0 | 0–¼ |
| V | Cu—$Al_2O_3$ | ...do... | 7 | 8 | ½–¾ |

It will be noted from Example I that when there was no protecting material, the minimum bed temperature increased thirteen degrees indicating that the catalyst was deactivating at a very rapid rate. Moreover, it will be seen from this example that the reforming catalyst was progressively poisoned from the top of the bed downwardly, since the position of the minimum bed temperature shifted downwardly.

Example II shows that the pure tetraethyl lead has no effect on the platinum-containing catalysts and that, therefore, it is the halogen in the tetraethyl lead fluid that causes poisoning of the catalysts.

Examples III demonstrates the effectiveness of the calcium oxide as a protecting agent and Example IV shows that barium oxide is effective as a protecting agent and may be used in conjunction with aluminum oxide.

Example V shows that neither metallic copper nor alumina is effective as a protecting agent.

In addition to these examples, additional experiments were carried out over longer periods of time.

EXAMPLE VI

A 50 cc. (43 gram) portion of a protecting material consisting of a pelleted mixture of 10 percent by weight calcium oxide and 90 percent by weight alumina was placed on top of a 50 cc. portion of a commercial platinum-silica-alumina reforming catalyst similar to that employed in Example I and contained in a laboratory reforming reactor. An East Texas distillate having the same properties as that employed in Example I, but containing 3 cc. per liter of ethylene bromide, was passed over the protecting material and catalyst under the same conditions as in Example I for six hours. During that time there was no change in the minimum bed temperature and no change in location in the minimum bed temperature. The passage of the East Texas distillate was then discontinued and the calcium oxide converted to the sulfide by the use of $H_2S$. Upon completion of the sulfiding operation the East Texas distillate containing the ethylene bromide was again passed over the protecting material calcium sulfide and platinum containing catalyst for a period of seven hours. During that time there was no increase in the minimum bed temperature and no change in the location of the minimum bed temperature. In a bromine balance in which the amount of bromine charged was compared with the amount of bromine taken up by the calcium oxide and calcium sulfide, it was found that the calcium compounds removed bromine in a ratio that was 77.5 percent of the stoichiometric ratio of calcium to bromine. These data show that halogen may be removed completely by the use of either calcium oxide or calcium sulfide when admixed with alumina and that such protection is completely effective in preventing the deactivation of the platinum containing reforming catalysts.

EXAMPLE VII

A 76 gram portion of a protecting material in the form of pellets which had been produced from a mixture of 10 percent by weight powdered barium oxide and 90 percent by weight powdered alumina was placed on top of 27 grams of a commercial silica-alumina reforming catalyst of the same type used in Example VI. An East Texas distillate having the same properties as that of Example I and containing 3 cc. per liter of ethylene bromide was passed over the above described protecting material and catalyst under the same reaction conditions as outlined in Example I. After fourteen hours on stream, there was noted less than an 0.5° F. rise in minimum bed temperature and no change in location. A bromine balance showed that barium oxide removed bromine in a ratio of approximately 95 percent of theory.

It will be seen from Examples VI and VII that it is possible to calculate quite easily the amount of protective material which should be employed.

If the protective material is to be placed on top of the catalyst in the reforming reactor, then the amount of protective material should be such that it will give protection throughout the life of the catalyst. Since the life of the catalyst is commonly expressed in barrels of charge per pound of catalyst and knowing the weight of the catalyst contained in the reactor, the total amount of charge which will be passed through the unit during the life of the catalyst may be calculated. If an average amount of halogen compound contamination be assumed for the charge material, the amount of protective material required, likewise, may be calculated assuming for the sake of safety a total capacity of 75 percent of theoretical for the protective material.

If the protective material is contained in a separate vessel preceding the reforming reactor, the amount of protective material may be chosen merely for convenience, since a standby vessel of protective material may be switched into service while the spent protective material in the first vessel is replaced.

We claim:

1. In a reforming process wherein a hydrocarbon charge material containing ethylene dichloride and ethylene dibromide resulting from tetraethyl lead fluid contamination is contacted with a platinum containing hydrocarbon reforming catalyst under reforming conditions, the improvement which consists of contacting said hydrocarbon charge material under reforming conditions with hydrogen and a solid alkaline earth metal compound selected from the group consisting of calcium oxide, calcium sulfide, barium oxide, and barium sulfide to produce the corresponding alkaline earth metal halides and contacting the dehalogenated hydrocarbon charge material with the platinum containing hydrocarbon reforming catalyst.

2. In a reforming process wherein a hydrocarbon charge material containing ethylene dichloride and ethylene dibromide resulting from tetraethyl lead fluid contamination is contacted with a platinum containing hydrocarbon reforming catalyst under reforming conditions, the improvement which consists of contacting said hydrocarbon charge material under reforming conditions with hydrogen and a mixture of an inert solid and a solid alkaline earth metal compound selected from the group consisting of calcium oxide, calcium sulfide, barium oxide, and barium sulfide to produce the corresponding alkaline earth metal halides and contacting the dehalogenated hydrocarbon charge material with the platinum containing hydrocarbon reforming catalyst.

3. The method according to claim 1 wherein the protecting material is calcium oxide.

4. The method according to claim 1 wherein the protecting material is calcium sulfide.

5. The method according to claim 1 wherein the protecting material is barium oxide.

6. The method according to claim 1 wherein the protecting material is barium sulfide.

7. The method according to claim 2 wherein the inert solid is alumina and the alkaline earth compound is calcium oxide.

8. The method according to claim 2 wherein the inert solid is alumina and the alkaline earth compound is calcium sulfide.

9. The method according to claim 2 wherein the inert solid is alumina and the alkaline earth compound is barium oxide.

10. The method according to claim 2 wherein the inert solid is alumina and the alkaline earth compound is barium sulfide.

References Cited in the file of this patent
UNITED STATES PATENTS

| | | |
|---|---|---|
| 1,869,781 | Shiffler et al. | Aug. 2, 1932 |
| 1,908,286 | Dorrer | May 9, 1933 |
| 1,914,668 | Lachman | June 30, 1933 |
| 2,341,567 | Moriarty | Feb. 15, 1944 |
| 2,413,871 | Hepp | Jan. 7, 1947 |
| 2,414,259 | Holm | Jan. 14, 1947 |
| 2,450,038 | Frey | Sept. 28, 1948 |
| 2,481,300 | Engel | Sept. 6, 1949 |

UNITED STATES PATENT OFFICE
CERTIFICATION OF CORRECTION

Patent No. 2,967,819            January 10, 1961

Leonard N. Leum et al.

It is hereby certified that error appears in the above numbered patent requiring correction and that the said Letters Patent should read as corrected below.

Column 3, line 17, beginning with "In order to demonstrate" strike out all to and including "nomenon." in line 22, same column; lines 53 and 54, for "dehydronation" read -- dehydrogenation --.

Signed and sealed this 30th day of May 1961.

(SEAL)
Attest:

ERNEST W. SWIDER            DAVID L. LADD
Attesting Officer            Commissioner of Patents